(12) United States Patent
Helms

(10) Patent No.: US 8,058,192 B2
(45) Date of Patent: Nov. 15, 2011

(54) FLORAL SLEEVE OF NON-WOVEN FABRIC

(75) Inventor: Tom Helms, Canal Fulton, OH (US)

(73) Assignee: Professional Package Company, Inc., Strongsville, OH (US)

(*) Notice: Subject to any disclaimer, the term of this patent is extended or adjusted under 35 U.S.C. 154(b) by 711 days.

(21) Appl. No.: 10/152,952

(22) Filed: May 21, 2002

(65) Prior Publication Data

US 2003/0220040 A1 Nov. 27, 2003

(51) Int. Cl.
*B32B 5/26* (2006.01)
*D04H 3/14* (2006.01)

(52) U.S. Cl. ........ 442/381; 442/389; 442/391; 442/392; 442/409

(58) Field of Classification Search .......... 442/381, 442/389, 391, 392, 409; 156/290, 308.4
See application file for complete search history.

(56) References Cited

U.S. PATENT DOCUMENTS

| | | | | |
|---|---|---|---|---|
| 3,790,992 A * | 2/1974 | Herz | ............................... | 24/400 |
| 4,192,122 A * | 3/1980 | Florindez | ...................... | 53/572 |
| 4,319,952 A * | 3/1982 | Schjeldahl | .................... | 156/510 |
| 4,333,267 A * | 6/1982 | Witte | ............................... | 47/84 |
| 4,513,445 A * | 4/1985 | Kamp | ................................ | 383/87 |
| 4,658,433 A * | 4/1987 | Savicki | ........................... | 383/63 |
| 4,820,254 A * | 4/1989 | Ziegelhoffer | ................. | 493/194 |
| 5,131,213 A * | 7/1992 | Shanklin et al. | ............... | 53/477 |
| 5,493,809 A * | 2/1996 | Weder et al. | ....................... | 47/72 |
| 5,676,467 A * | 10/1997 | Gebhardt | ........................ | 383/10 |
| 5,894,709 A * | 4/1999 | Fosshage | ........................ | 53/450 |
| 5,931,581 A * | 8/1999 | Garberg et al. | .................... | 383/9 |
| 5,964,688 A * | 10/1999 | Woody et al. | ................. | 493/207 |
| 6,385,905 B1 * | 5/2002 | Weder | ............................... | 47/72 |
| 6,718,741 B1 * | 4/2004 | Weder et al. | .................... | 53/592 |

* cited by examiner

*Primary Examiner* — Andrew Piziali
(74) *Attorney, Agent, or Firm* — Gordon D. Kinder

(57) ABSTRACT

A floral sleeve is made from two layers of non-woven thermoplastic fabric such as polypropylene. The layers are joined at the side seams of the sleeve by first pre-sealing the edges and thereafter trimming them. Pre-sealing compresses the fabric to make it denser along a band and applying heat causes the band to retain the compressed and at least partially fused set. Trimming may be done using a hot knife that completes the fusing process of the layers to each other. Alternately, the pre-sealing step may form a satisfactory fusion between the layers and the trimming step need not effect further fusion.

10 Claims, 6 Drawing Sheets

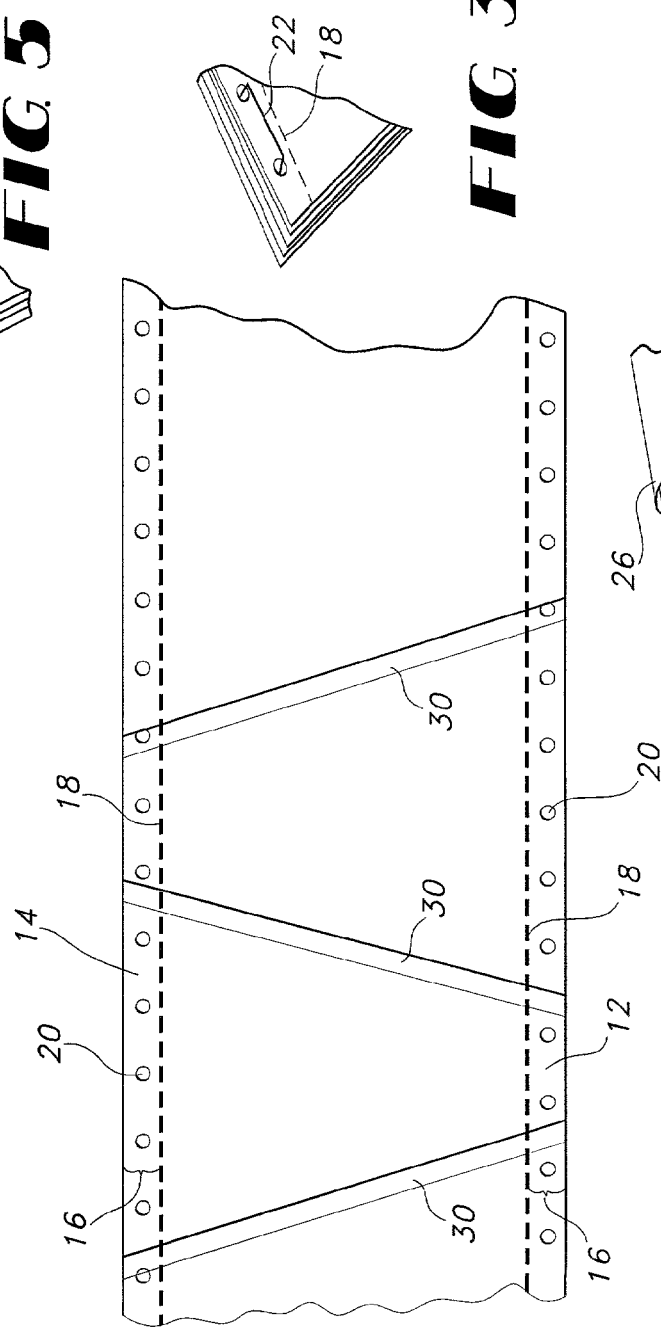

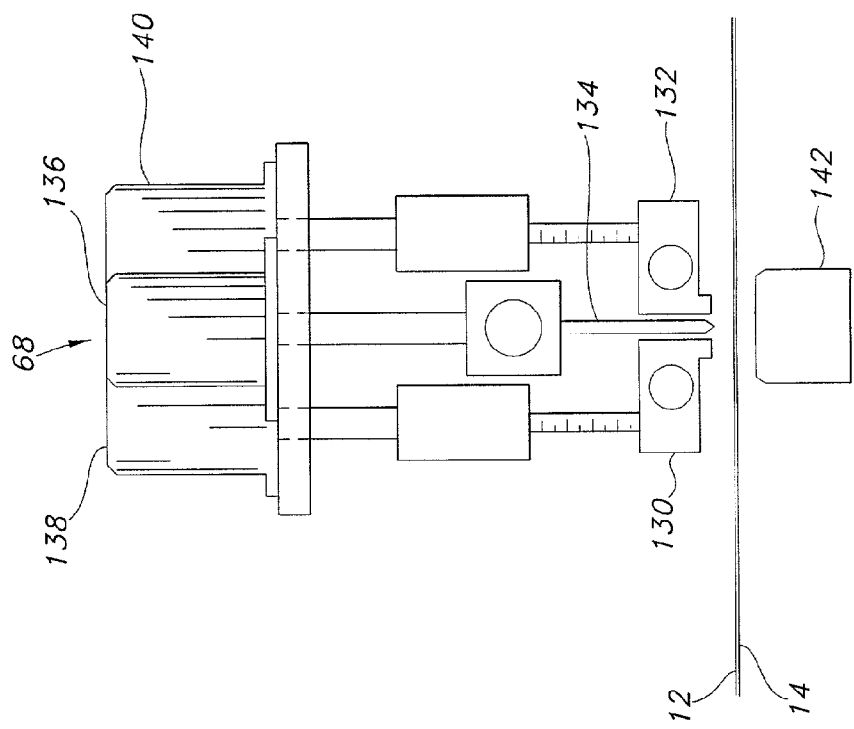

FLORAL SLEEVE OF NON-WOVEN FABRIC

FIELD OF THE INVENTION

The present invention relates to sleeves for packaging floral groupings, and in particular to methods for making sleeves of thermoplastic materials.

BACKGROUND OF THE INVENTION

Sleeves are used in the floral industry to package floral groupings for shipment between growers and retail outlets and also at retail outlets for packaging goods for sale to retail customers. Floral groupings include pot plants, bouquets and similar materials. Sleeves for floral groupings come in a variety of sizes and shapes, and generally are tapered or frusto-conical to hold a pot plant or bouquet. The sleeves may have open bottoms or closed bottoms.

Sleeves of this sort have been made from webs of thermoplastic material. In a conventional sleeves making machine, the web is folded to form two layers (or two separate webs may be provided) and fed incrementally through a machine which cuts and fuses the edges of each sleeve with a hot knife.

In sleeves of this sort it is important that the seals along the edges be strong. Past attempts to make such sleeves from two layers of non-woven, thermoplastic fabric have resulted in seals that were not satisfactory. Neither a grower nor a customer wants a pot plant to fall through the bottom of the sleeve because the seals at the sleeve's side edges were insufficiently strong.

SUMMARY OF THE INVENTION

The present invention teaches how to make a sleeve from two layers of non-woven fabric material. The layers are fused to each other and trimmed in a two step process that fuses the two layers together to provide a seal that is as strong as the fabric itself. A pair of heater bars are located, one above and the other below, the two layers. The layers are pressed between the bars to pre-seal each seam. Thereafter a cutting device is used to trim the sleeves. The temperature, pressure, and duration of the contact between the heater bars and the webs is adjusted to compress the non-woven material. The pre-sealing may also be adjusted to form a permanent bond between the layers.

In commercial production the sleeves are formed from webs of material. Two webs are fed into a sleeve machine. There the webs are pre-sealed by two sets of heater bars to form a band of compressed fabric on either side of each sleeve. Thereafter the webs are fed through the machine for further processing and then trimming by cutting devices that are positioned to cut through the middle of each compressed band. The present invention is applicable to sleeves that are open bottomed or closed bottomed, and it may be applied to a pre-sealing process that is effective to bond permanently the two layers to each other or to a pre-sealing process that requires further treatment to achieve a sufficiently strong connection between the two layers.

The sleeve made by following the teachings of the present invention has side seams that are as strong as the fabric itself, permitting a floral sleeve to be made entirely of non-woven fabric.

BRIEF DESCRIPTION OF THE DRAWINGS

FIG. 2 is a plan view of a pair of webs in the machine of FIG. 1 after they have been pre-sealed and before they have been cut to form individual sleeves.

FIG. 3 shows a partially cut away group of sleeves mounted on a wicket.

FIG. 4 shows a partially cut away group of sleeves bound with cardboard and staples.

FIG. 5 shows a partially cut away group of sleeves stapled to a wooden slat.

FIG. 9 is a view similar to FIG. 8 but showing another device for practicing the present invention.

DESCRIPTION OF INVENTION

Figure 1:
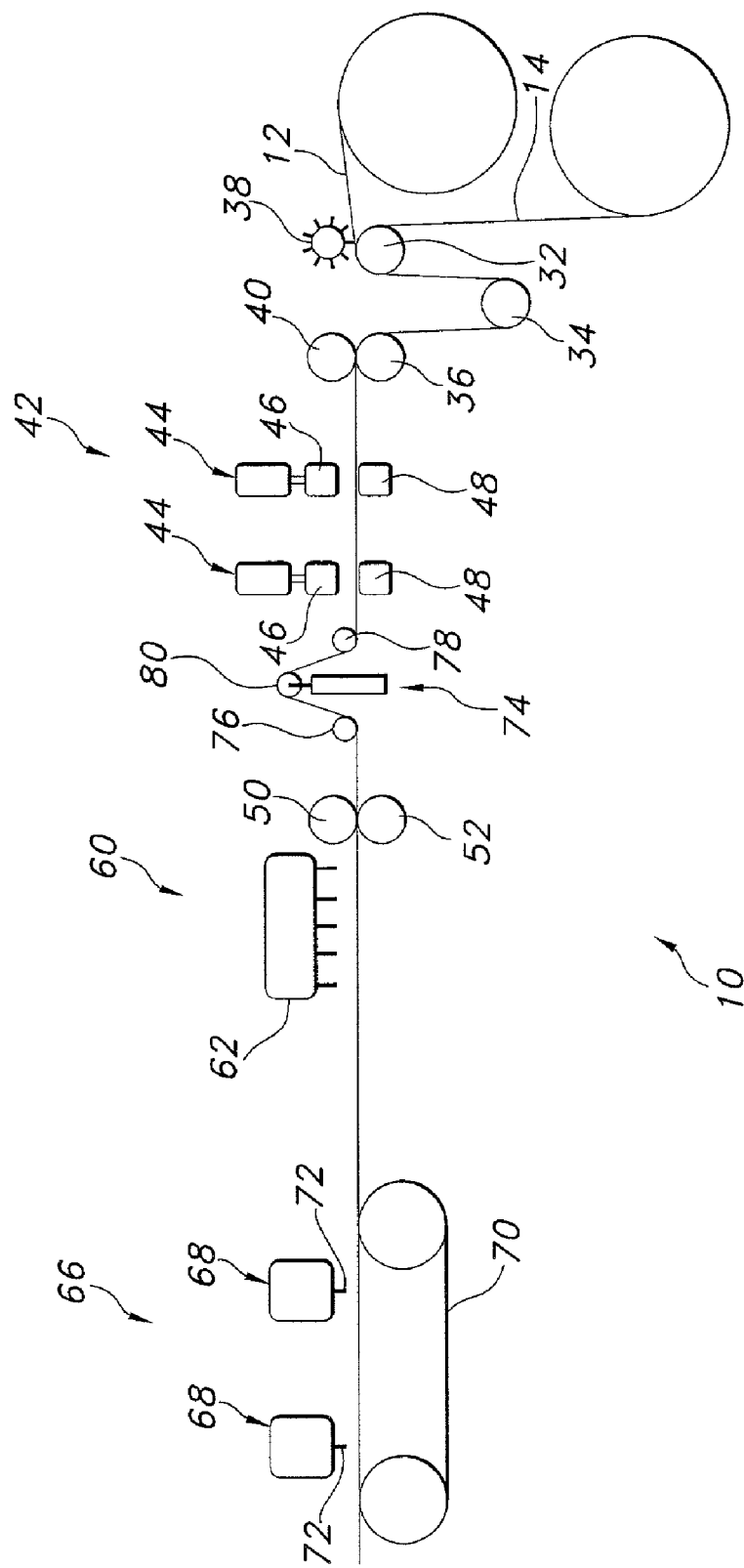
FIG. 1 is a schematic side elevation view of a sleeve making machine constructed using the precepts of the present invention.

The sealing machine 10 shown schematically in FIG. 1 uses the present invention to make floral sleeves from webs 12, 14 of non-woven fabric. The webs 12, 14 are made of a thermoplastic material, typically polypropylene, although other thermoplastic materials may also be used.

FIG. 2 illustrates the pair of webs 12, 14 used to make sleeves after the webs have been pre-sealed and before they are trimmed to make separate sleeves. The webs 12, 14 are superimposed on each other with an offset 16 so that a header-forming, single-layer margin is formed on each side. Rows of perforations 18 enable each sleeve to be easily separated from its header.

The webs 12, 14 shown have a series of holes 20 through each margin for mounting the sleeves on wickets 22 (FIG. 3). If groups of the finished sleeves are not to be wicket-mounted, then these holes may be omitted. Other techniques used to group the finished sleeves include stapling a group of the sleeves to a wooden slat 24 (FIG. 5) and folding a cardboard binding 26 (FIG. 4) over part of the headers of a group of sleeves and stapling the binding in place. In any of these cases, the sleeves may be collated into a group, and the group bound together by forcing a hot pin or punch through the headers. This melts adjacent sleeves to each other and so binds the group.

Individual sleeves on the webs 12, 14 are marked by symmetrical bands 30 of compressed fabric. To finish the webs shown in FIG. 2 into sleeves, the sleeves are trimmed. The trimming process may include simply cutting down the middle of each band, or it may include an operation that both cuts and seals the edges at the same time. The sleeves may then be stacked and shipped for use.

The operation of the machine 10 carrying out the present invention can be described as follows. The webs 12, 14 laterally offset as shown in FIG. 2, move over a fixed roll 32 (FIG. 1), under a dancer roll 34, and over a second fixed roll 36. Spiked wheels 38, one to form each line of perforations 18, are mounted to run against the first fixed roll 36 on each side of the machine. A nip roll 40 may be used to run against the second fixed roll 36. This nip roll 40 and/or the second fixed roll 36 may be driven intermittently to advance the webs 12, 14 through the machine 10.

After passing over the second fixed roll 36, the webs enter a pre-sealing station 42. Here the bands 30 (FIG. 2) of compressed fabric are formed. The present invention teaches that each band 30 may be made by a sealing head 44 that includes a pair of heater bars, one 46 above the webs and the other 48 aligned with it and below the webs 12, 14. As discussed more fully below, the heater bars 46, 48 may form a band 30 that is a pre-seal. This pre-seal flattens the webs 12, 14, compressing the fibers and making a denser fabric. The application of heat and pressure causes the webs 12, 14 to retain this compressed set. Thereafter, the webs may be trimmed in a conventional manner that causes the edges where a knife that passes through the fabric to melt and fuse them together.

The present invention may also use techniques in the pre-sealing station 42 to form a pre-seal that bonds the webs to each other along the bands 30 with a connection that is essentially permanent and as strong as the fabric itself. This may be done by adjusting the temperature, pressure, and dwell time of the heater bars 46, 48. It may also be done using ultrasonic devices to locally heat the fabric or by using a laser or other source of coherent electromagnetic radiation or any other energy transmitting device for the same purpose. If alternative energy transfer techniques are used, the heater bars 44 and 46 are replaced with suitable devices that provide a surface to press the webs together along the bands 30 and transfer energy to the fabric so as to either permanently join the layers of fabric or cause the fabric to retain its compressed set until the edges are fused in a later operation.

After the bands 30 (FIG. 2) are formed, the webs 12, 14 pass through a second set of nip rolls 50, 52. These rolls 50, 52 are driven to pull the webs 12, 14 intermittently through the pre-sealing station 42. With some web materials, these rolls are driven rolls, and the upper nip roll 40 can be eliminated.

After the webs pass through the nip rolls 50, 52 they enter a cutting station 60 where any of various cuts may be made. For example, a heated punch 62 may be used to form the wicket holes 20 (FIG. 2). Other cutting operations may also be performed at this location.

Once any necessary cutting and/or punching of the webs has been completed, the webs advance to a sealing station 66. In the sealing station, the webs 12, 14 are trimmed, cutting the individual sleeves from the incoming webs. This can be accomplished in any of several ways, depending in part on how the bands were formed.

One way to cut the webs 12, 14 is to use cutting devices 68 such as hot knives 72. The knives are mounted in a conventional manner so that they can be brought down against the webs 12, 14 to melt locally and seal the edges of the sleeves, two edges at a time. To support the sleeves during this process the webs may be supported by a heat resistant belt 70 made, for example, of Teflon or Teflon coated material. Instead of a moving belt, the machine may include a bar (e.g., 142 in FIG. 9) that is mounted below the webs aligned with the knives 72.

The hot knives 72 are appropriate to seal and cut the webs 12, 14 when the bands 30 have been formed by a pre-sealing step that does not completely bond the webs. In this case, the fusing must be completed in the sealing station 66.

Where the bands 30 made in the pre-sealing process are sufficiently strong to function as seals, then other trimming techniques at the sealing station 66 may be used. For example, the cutting devices 68 may be replaced by so-called flying knives (not shown). These knives are mounted on tracks and moved widthwise across the bands 30 to sever the sleeves. The flying knives may be either heated or not. If heated, the flying knives may further seal the edges to finish them by melting them slightly to eliminate rough edges.

The machine 10 uses conventional, regularly spaced marks on the webs 12, 14 to index their progress through the machine 10. The marks are read by an optical device and the resulting signal is used to activate the drive of the nip rolls 36, 40, 50 and 52. Because this system is common in the trade no further description is necessary for one of ordinary skill in the sleeve making art. The control signals are also used to synchronize the actions of the pre-sealing station 42, the cutting station 60 and the sealing station 66.

The pre-sealing station 42 uses heater bars 46, 48 to make the bands 30. The heater bars 46, 48 and thus the bands 30 are approximately one-half inch wide. Once the bands 30 are formed, the webs 12, 14 are advanced through the cutting station 60 to the sealing station 66. The sealing station 66 must cut and seal along the approximate center of the bands 30, leaving about one-quarter inch on each margin of each sleeve. To achieve the accurate placement of the seal made at the sealing station 66, the machine 10 includes a registration adjustment 74.

Registration is adjusted by varying the path length of the webs 12, 14 between the pre-sealing station 42 and the sealing station 66. The webs 12, 14 are fed under two rolls 76, 78 and over a third roll 80 which is located between them. The third roll is height adjustable. This makes it possible to change the path length between the pre-sealing station 42 and the sealing station 66, and so accurately to locate the cuts and seals made at the sealing station.

As noted above, the two webs 12, 14 are formed of a non-woven fabric. This material is a thermoplastic polyolefin, and may be any polyolefin including polybutylene, polypropylene, polyethylene, and/or polystyrene. As described, the two webs are of the same material, but they may be of different materials so long as the performance and sealing requirements are met.

Figure 6:
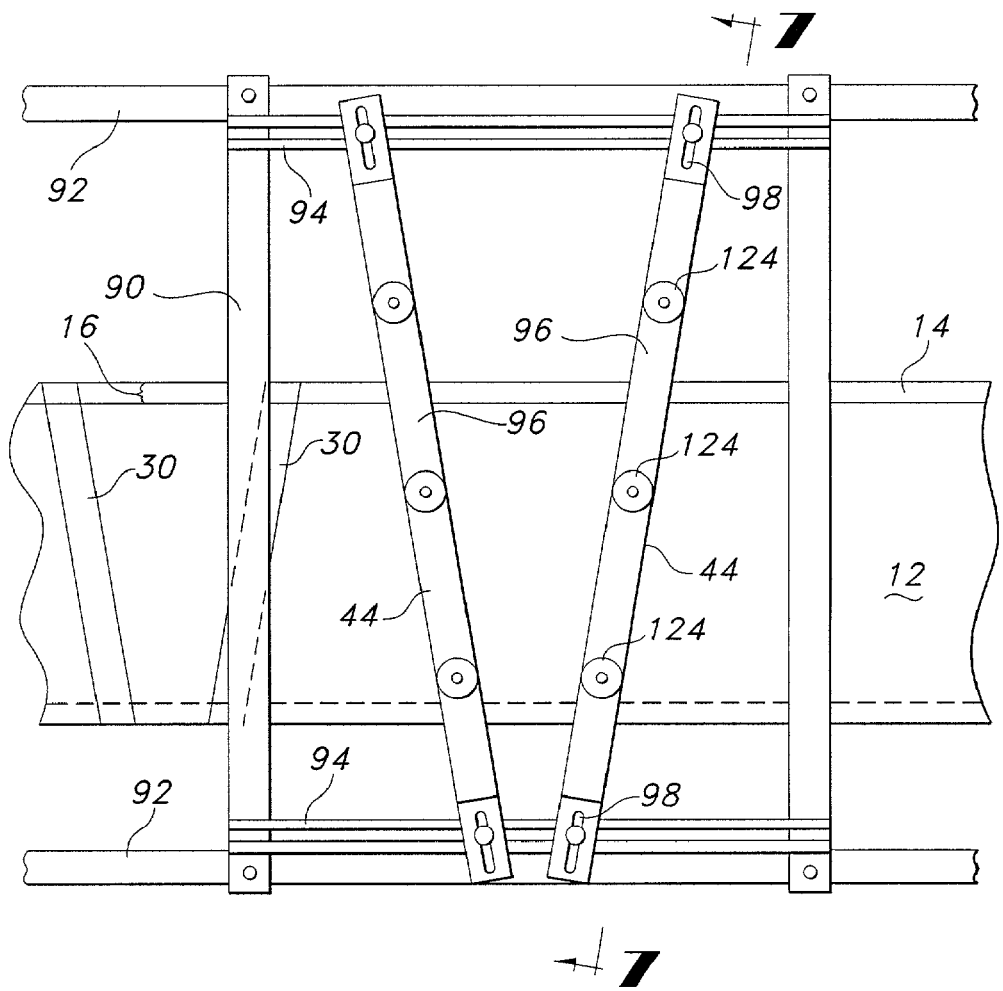
FIG. 6 is a plan view of a portion of the machine of FIG. 1 showing a pre-sealing section mounted between the side rails of the machine.

FIG. 6 illustrates the pre-sealing heads 44 and supporting framework 90, looking down from above. There are two identical pre-sealing heads 44 that operate simultaneously so as to make two bands 30 (FIG. 2) at a time. The framework 90 that supports the pre-sealing heads 44 is mounted to the side rails 92 of the machine 10, and it includes slotted rails 94 that extend parallel to the movement of the web. Because the two pre-sealing heads 44 are identical, only one is described in detail. The description applies equally to the other pre-sealing head.

Figure 8:
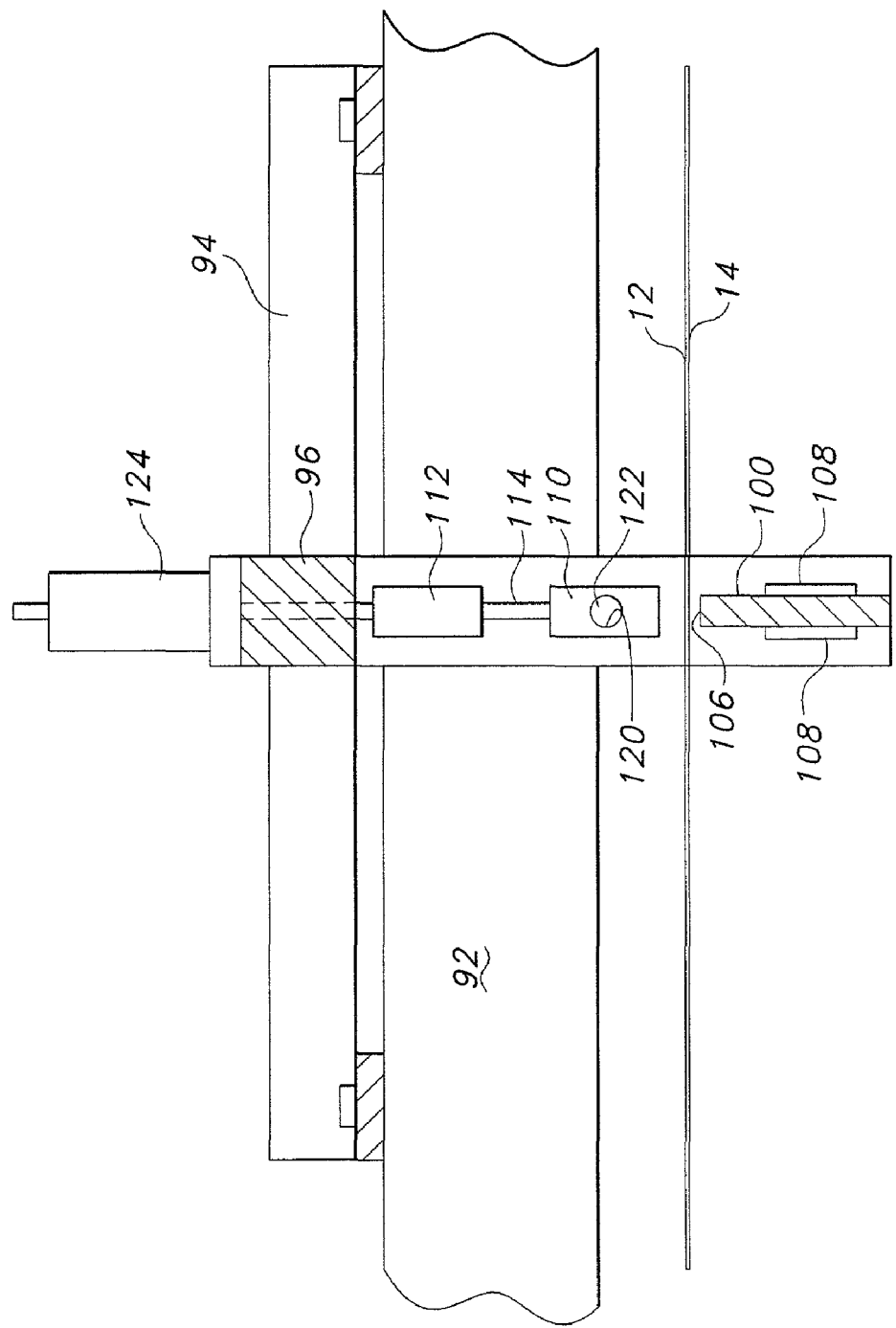
FIG. 8 is a view looking in the direction of arrows 8-8 of FIG. 7.

The pre-sealing head 44 includes a cross member 96 (FIG. 8) that extends between the slotted rails. The cross member 96 has slots 98 at both ends. Accordingly, the position of the cross member 96 along the path of the web and the cross member's angle to the path of the web can be adjusted.

Figure 7:
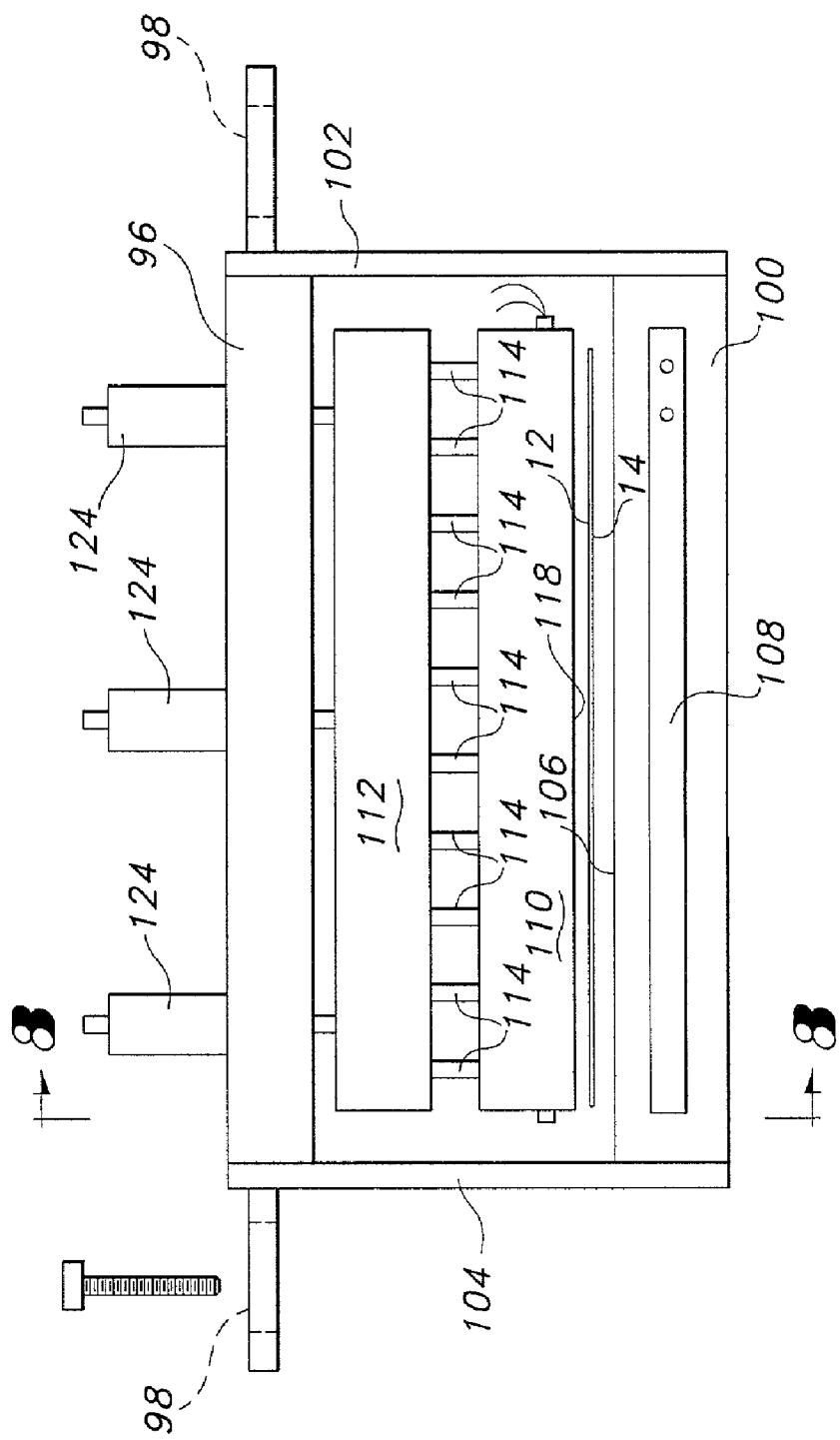
FIG. 7 is an elevation view looking in the direction of arrows 7-7 of FIG. 6.

A lower heater bar 100 (FIG. 7) is suspended below the cross member 96 by supports 102 and 104. The top face 106 of the lower heater bar 100 is positioned just below the path of the webs 12, 14 so that with only a slight downward deflection of the webs, the bottom web 14 can be pressed against the lower heater bar.

The lower heater bar 100 is a steel bar with electric heater strips 108 (FIGS. 7 and 8) located on each side. The top face 106 of the heater bar may be coated with Teflon or otherwise treated to allow it to release the webs easily. A thermostatic control (not shown) is used to establish and maintain the temperature of the lower heater bar 100.

The upper heater bar 110 (FIGS. 7 and 8) is supported by a heater mount 112. A series of threaded studs 114 allows for careful adjustment of the profile of the upper heater bar 110. Although the upper heater bar 110 is nominally flat across its bottom surface 118, it may be necessary to bend it slightly across the width of the web 5, 12, 14 in order that the sealing operation results in a uniform seal. The upper heater bar 110 has an internal bore 120 (FIG. 8) that holds a heater element 122. A thermostatic controller (not shown) establishes and maintains the temperature of the upper heater bar 110.

The upper seal mount 112 is a rigid member, essentially unbendable under the forces involved in the sealing operation. It therefore provides a rigid base into which the threaded studs 114 are mounted. By turning the studs 114 and locking them in position with lock nuts (not shown) the profile of the upper heater bar 110 can be adjusted.

The upper seal mount 112 is connected to the cross member 96 by a series of air cylinders 124. For a pair of webs 12, 14 approximately 24 inches wide, three air cylinders 124 are used. A controller (not shown) is synchronized with the incremental movement of the webs and actuates the air cylinders 124 to press the upper seal mount 112 and the so the upper heater bar 110 against the webs 12, 14 when they are in position. As the upper heater bar 110 moves down, the webs travel downward a short distance until they contact the top surface 106 of the lower heater bar 100, and the desired pre-sealing is effected. The duration of the pressure cycle, the amount of force applied to the webs, and the temperature of the upper heater and lower bars can be controlled for effective pre-sealing of the webs along the bands.

More or fewer air cylinders 124 could be used, so long as a fairly even and controllable downward force is applied to the upper seal mount 112. The cylinders 124 need not be pneumatic; they could be hydraulic or electric. The cylinders 124 could be replaced with the mechanical linkage, so long as the purposes of the invention are achieved.

The pre-sealing and sealing operations are shown as being separated, but this need not be so. For example, each of the two cutting devices 68 in the sealing station 66 may include a pair of narrow, e.g., one quarter inch wide, pre-sealing heater bars 130, 132 (FIG. 9) located one on each side of a hot knife 132. Movement of the heater bars 130, 132 is independent of the movement of the cutting device 68. Accordingly, the hot knife 134 is moved by a row of air cylinders 136, and a row of air cylinders 138, 140 is connected to each of the heater bars 130, 132, respectively. A backup bar 142 is located below the webs. It may be coated with Teflon or another release agent and it may also include a heating element. Depending on the cycle time, temperature and pressure of the pre-sealing heater bars 130, 132, the loft of the fabric webs 12, 14 may be ironed out to form the bands 30, or an effective fusing of the two fabric layers may be formed. Thereafter, the hot knife 134 is used to sever each sleeve from its neighbors.

Thus it is clear that the present invention teaches how to make a sleeve from two layers of non-woven fabric material. The layers may, but need not, be supplied in the form of webs 12, 14 are fused to each other and trimmed in a two step process that fuses the two layers together to provide a seal that is as strong as the fabric itself. A pair of heater bars are located, one 46 above and the other 48 below, the two layers. The layers are pressed between the bars 46, 48 (FIG. 8), 130, 132, 142 (FIG. 9) to pre-seal each seam. Thereafter a cutting device 68 is used to trim the sleeves. The temperature, pressure, and duration of the contact between the heater bars 46, 48, 130, 132, 142 and the webs 12, 14 is adjusted to compress the non-woven material. The pre-sealing may also be adjusted to form a permanent bond between the layers.

In commercial production the sleeves are formed from webs 12, 14 of material. Two webs are fed into a sleeve machine 10. There the webs are pre-sealed by two sets of heater bars 46, 48 to form a band 30 of compressed fabric on either side of each sleeve. Thereafter the webs 12, 14 are fed through the machine for further processing and then to a trimming station 66 where cutting devices cut through the middle of each compressed band 30. The present invention is applicable to sleeves that are open bottomed or closed bottomed, and it may be applied to a pre-sealing process that is effective to bond permanently the two layers to each other or to a pre-sealing process that requires further treatment to achieve a sufficiently strong connection between the two layers.

The sleeve made by following the teachings of the present invention has side seams that are as strong as the fabric itself, permitting a floral sleeve to be made entirely of non-woven fabric.

What is claimed is:

1. A sleeve made by a method of forming sleeves for a floral grouping from a non-woven fabric comprising the steps of:
   superimposing two layers of non-woven fabric; and
   forming an edge portion of a sleeve that includes forming a pre-sealed band, moving the layers to a different location, and thereafter forming a sealed edge adjacent to the pre-sealed band, the step of forming a pre-sealed band comprising the step of pressing the fabric layers between heater bars to set the fabric in a flattened condition and the step of forming a sealed edge comprising the step of locally melting the flattened fabric layers without forming a fin seal between the two layers of non-woven fabric, wherein the heater bars apply thermal energy to compress the fabric.

2. The sleeve of claim 1 wherein the two layers of material are made of the same non-woven fabric.

3. The sleeve of claim 1 wherein the two layers are made of different non-woven fabrics.

4. A group of sleeves according to claim 1 wherein each sleeve includes holes which align to receive a wicket.

5. A group of sleeves according to claim 1 wherein the group is mounted to a wooden slat.

6. A group of sleeves according to claim 1 wherein the group is bound with a cardboard binder.

7. A group of sleeves according to claim 1 wherein the group includes at least one hole through the headers of the sleeves in the group that binds the sleeves to each other.

8. A sleeve made of non-woven fabric for receiving a floral grouping, the sleeve having first and second layers of non-woven fabric, the layers forming front and back walls of a floral sleeve that can be opened from a flat condition to an open condition, the sleeve in the flat condition having side edge portions where the front and back walls are joined to each other without forming a fin seal between the first and second layers of non-woven fabric, each edge portion including a marginal band where the fabric layers are compressed but not permanently bonded and a peripheral edge adjacent to the band of compressed fabric.

9. The sleeve of claim 8 wherein the two layers of non-woven fabric are fused along the peripheral edges of the bands.

10. The sleeve of claim 8 wherein the fabric of the front and back layers is at least partially fused at the marginal band.

\* \* \* \* \*